United States Patent [19]

Fargier et al.

[11] Patent Number: 4,832,160

[45] Date of Patent: May 23, 1989

[54] WEAR INDICATOR FOR A FRICTION MEMBER OF A MOTOR-VEHICLE BRAKE AND FRICTION MEMBER EQUIPPED WITH SUCH AN INDICATOR

[75] Inventors: Eric Fargier, Neuilly-Plaisance; Jean-Claude Mery, Pavillon-Sous-Bois, both of France

[73] Assignee: Bendix France, Drancy, France

[21] Appl. No.: 209,657

[22] Filed: Jun. 21, 1988

[30] Foreign Application Priority Data

Jun. 25, 1987 [FR] France ................. 87 08918
Aug. 14, 1987 [FR] France ................. 87 11580

[51] Int. Cl.⁴ .............................................. F16D 66/02
[52] U.S. Cl. ..................................... 188/1.11; 116/208
[58] Field of Search ....................... 116/208; 188/1.11; 340/52 H, 52 B

[56] References Cited

U.S. PATENT DOCUMENTS 3,611,283 10/1971 Anders et al. ................. 188/1.11 X
3,783,979 1/1974 Hess ............................... 188/1.11

FOREIGN PATENT DOCUMENTS 2288625 5/1976 France ............................ 188/1.11
1266276 3/1972 United Kingdom ............ 188/1.11

Primary Examiner—Duane A. Reger
Attorney, Agent, or Firm—Larry J. Palguta; Ken C. Decker

[57] ABSTRACT

The indicator comprises a loop of an electrical conductor 2 embedded in a body 1, from which a stud 3 and a lug 4 project. The stud 3 is pushed into a hole 9 made in a support plate 5 of the friction member, and the rest of the body and the lug 4 are turned down round one edge of the plate as a result of the deformability of the body between the stud 3 and the 4. The groove formed at the end of the stud 3 makes it possible to retain the lug 4 against the support plate in order to ensure that the indicator is fastened to this plate. The invention is used on disc brakes or drum brakes for motor vehicles.

11 Claims, 3 Drawing Sheets

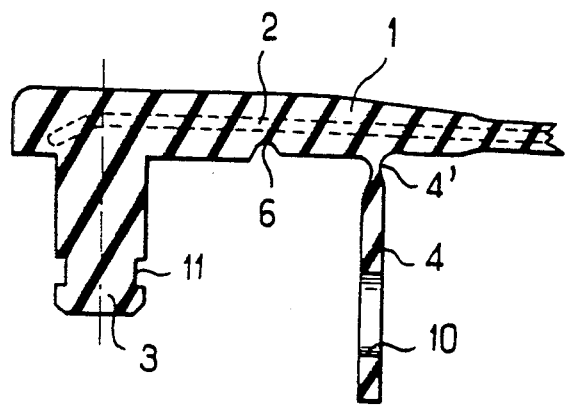
FIG_1
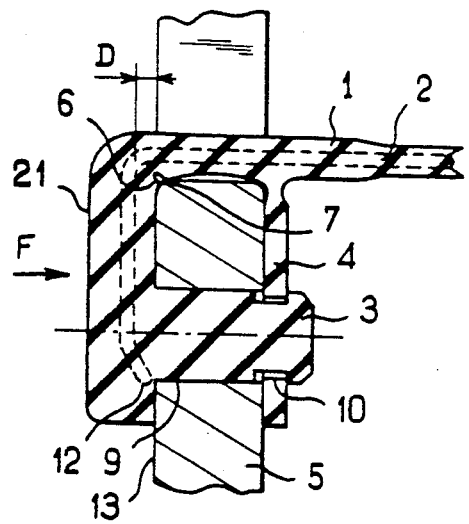
FIG_2
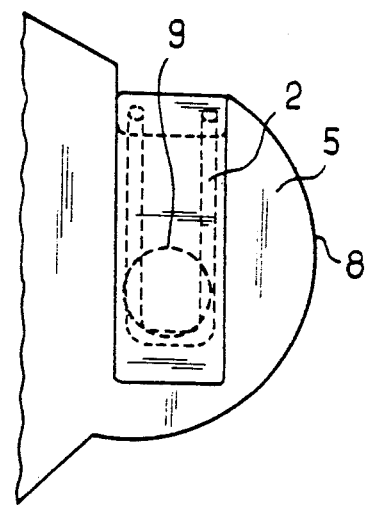
FIG_3

WEAR INDICATOR FOR A FRICTION MEMBER OF A MOTOR-VEHICLE BRAKE AND FRICTION MEMBER EQUIPPED WITH SUCH AN INDICATOR

The present invention relates to a wear indicator for a friction member and more particularly to such an indicator designed for equipping a friction member of a disc brake or drum brake for a motor vehicle.

Such indicators are known, and they work by grounding an electrical conductor via the vehicle when the thickness of the lining of the friction member in a direction perpendicular to its wearing plane becomes less than a predetermined value, below which the quality and reliability of braking are considered unacceptable. This grounding is normally the result of the wear of a sheath protecting the conductor caused by a metal disc or drum fixed in terms of rotation to a vehicle wheel and forming part of the brake, the conductor then being brought in contact with this disc or drum. An electrical circuit controls the flow of a current in the conductor, and this current causes a visual indicator to light up. This signal warns the vehicle user that the friction member is worn and must therefore be replaced.

Because a current can flow through the conductor only after earthing, it is not possible to test the proper operation of the circuit and of the visual indicator before the friction member has reached its critical wear.

To overcome this disadvantage, there are wear indicators designed in such a way that the electrical conductor forms a loop which is cut when the critical wear of the associated friction member is reached. The electrical continuity of the loop can then be tested at any moment before this loop is broken.

It is an object of the present invention to provide a wear indicator of this type, which ensures a clean break of the loop when the critical wear of the associated friction member is reached and which is installed easily and securely and is cheap to produce.

According to the present invention, there is provided a wear indicator for a friction member of a motor-vehicle brake, designed to be mounted on the friction member in such a way that an electrical conductor forming part of the indicator is engaged by a rotary piece forming part of the brake when the friction member reaches a thickness below a predetermined value, this indicator comprising an elongate body supporting the electrical conductor and means of fastening the body to the friction member, characterized in that the fastening means consist of a lug and a stud which are arranged at a distance from one another and which project from the body on each side of a deformable part of the latter, the stud being shaped so as to enter a hole made near one edge of the friction member and, after the bending of the deformable part of the body, catch in an orifice made in the lug.

According to another embodiment of the invention, it may be provided that the fastening means consist of a removable piece and a stud which are arranged on the indicator on each side of a deformable part of the latter, the stud being shaped so as to enter a hole made near one edge of the friction member and, after the bending of the deformable part of the body, catch in an orifice made in the removable piece.

The indicator according to the invention can be produced by molding the body and the stud in one piece, thus simplifying the mold used and thereby reducing its cost, the removable piece then taking the form of an attached piece to be mounted on the indicator in order to fasten the latter to the friction member.

The invention will now be described by way of example with reference to the accompanying drawings in which:

FIG. 1 is a view in axial section of the wear indicator according to the invention, before it is fastened to the associated friction member;

FIG. 2 is a view in axial section of the indicator of FIG. 1, after it has been fastened to the associated friction member;

FIG. 3 is a view of the wear indicator of FIG. 2, taken in the direction of the arrow F of this figure.

Figure 4:
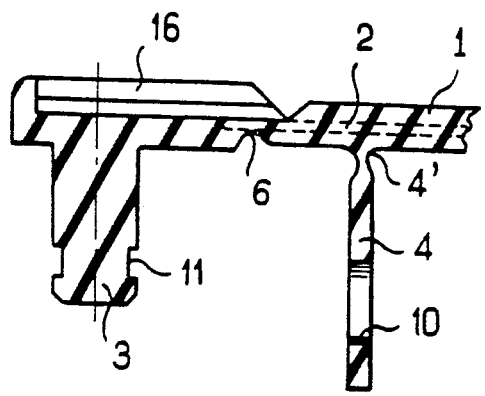
FIGS. 4 to 6 are similar to FIGS. 1 to 3 and illustrate a second embodiment of the wear indicator according to the invention.

In FIG. 1, it can be seen that the indicator according to the invention comprises essentially a plastic body 1, in which a wire-shaped electrical conductor 2 is embedded. A stud 3 and a lug 4, arranged at a suitable distance from one another, project from the same side of the body 1 to form means for fastening the indicator to a friction member.

The root 4' of the lug 4 is thinned in order to give the latter flexiblity and thus allow a certain tilting of the lug on the body 1, making it easier to mount the indicator on the friction member.

All these elements of the indicator can be produced by molding onto the conductor 1 a suitable plastic selected by a person skilled in the art, according to the following characteristics, from the very many plastics found in the trade which can be used in the invention. This plastic must be sufficiently flexible to allow the body 1 of the indicator to be bent into the position shown in FIG. 2. To make this bending easier, a transverse weakening incision 6 is made in the body between the stud 3 and the lug 4, in a position corresponding to that part of the body which faces an edge 7 of the support plate 5 when the indicator is mounted on the latter. Furthermore, it must be possible for the selected plastic to be torn off easily as a result of friction on the rotary metal piece, as will be seen later. As an example, the polyimide sold under the brand name of "Vespel" by the company Dupont de Nemours is suitable for the indicator according to the invention, as is the fluorocarbon resin known as Teflon PFA.

FIG. 2 illustrates the indicator according to the invention fastened to a support plate 5 forming part of a friction member for a disc brake which also has a friction lining (not shown) secured to this plate. Such a type of friction lining is described and illustrated in European Patent EP-A-0 No. 100 273, to which reference may be made for more details, without this example being limiting. The indicator is preferably fastened to a part of the support plate which is set apart from that carrying the lining, for example in a lateral part of the support plate limited by a circular profile 8 and intended to interact with matching circular profiles of a fixed support of, for example, a disc brake with a sliding caliper, as shown in the above mentioned patent. To fasten the indicator according to the invention to the support plate 5, the stud 3 is inserted in the direction of the arrow F (FIG. 2) into a hole 9 made in this plate, and the body 1 and the lug 4 are turned down round the edge 7 by means of the incision 6, to make the projecting end of the stud 3 enter an orifice 10 made in the lug 4 opposite this end. Retention means consisting of an annular groove 11 made near the end of the stud 3 ensure that the lug 4 catches on the stud by bearing on the edge of the orifice 10. It will be seen that the indicator installed in this way grips the support plate 5 firmly by bearing on two zones of this plate which form wide surfaces, ensuring that the indicator is supported when it is subjected to forces generated by a rotary piece, such as a disc which is fixed to a vehicle wheel and which, during braking, interacts with the lining carried by the support plate. The face 21 of the body 1 is parallel to the plane of rotation of the disc. When the lining becomes worn, this disc finally comes into contact with this face 21 of the indicator, the plastic of which is then progressively torn off as result of friction, until the disc comes in contact with the conductor 2. According to an embodiment of the indicator give purely as an example, the conductor 2 is then grounded earthed and a luminous indicator controlled by a suitable electrical circuit connected to this conductor lights up, only during braking periods, in order to signal the start of wear of the linings.

In FIG. 3, it will be seen that the conductor 2 takes the form, parallel to the wearing plate, of a loop which descends level with the stud 3. Thus, if the wear of the indicator continues despite the periodic warning given in the way explained above, and the disc cuts the wire completely, a continuous-warning indicator can be excited in order to signal to the vehicle user that the wear limit of the blocks is reached or exceeded and that replacement of the block is necessary urgently.

FIG. 2 shows that the end 12 of the loop formed by the conductor 2 in the body 1 is bent towards the support plate. This arrangement makes it possible to ensure the anchoring of the loop in the body when the brake disc begins to engage on the loop, up to the clean break of this loop as a result of the continuation of the friction generated by the disc. This loop is thus prevented from breaking erratically. FIG. 2 also shows clearly that the loop extends in a plane substantially parallel to the wearing plane. The distance D between the plane of the loop and the opposite face 13 of the support plate defines the minimum acceptable thickness of the lining carried by this plate. Tests have shown that this tangential arrangement of the loop ensures a cleaner break of the loop by the disc than when this loop is oriented perpendicularly to the wearing plane, as in some wear indicators of the prior art where this perpendicular arrangement increases the resistance of the wire of the loop to cutting by the disc.

Figure 5:
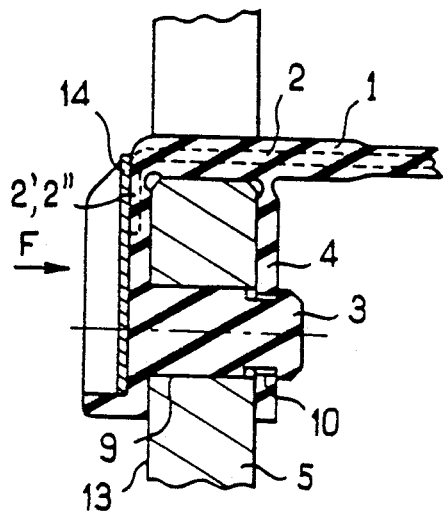
Figure 6:
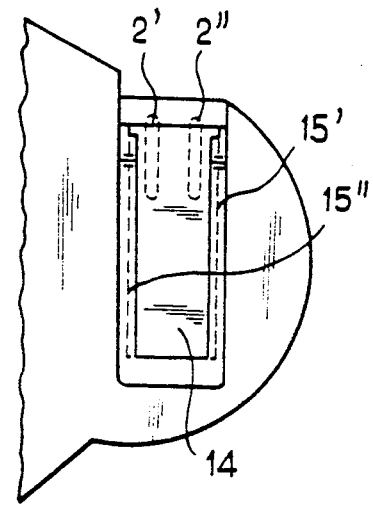

FIGS. 4 to 6 illustrate a second embodiment of the wear indicator according to the invention, designed to ensure an even cleaner break of the electrical continuity of the conductor. In many other respects, the two embodiments of the indicator according to the invention are very similar, and identical reference numerals identify similar elements to the two indicators in the drawing.

The indicator of FIGS. 4 to 6 differs from the preceding one in that the electrical continuity of the conductor in ensured in the body 1 by a metal plate 14 which, as a result of the contact, bridges two adjacent ends 2', 2'' of wires forming part of the conductor 2 (see FIGS. 5 and 6). The plate is slipped into flutes 15', 15'' formed in the body at the bottom of a cut-out 16 made in the upper part of the body 1 (FIG. 4).

To produce the wear indicator of FIGS. 4 to 6, the ends 2', 2'' of the wires of the conductor 2 are molded over in such a way that they remain bare at the bottom of the cut-out 16. After the indicator has been bent slightly about the incision 6 to expose the entrance of the flutes 15', 15'', the metal plate 14 is slipped into these flutes up against the ends 2', 2'' of the conductor 2 and up against the bottom of the cut-out, to ensure intimate contact between the plate and the ends 2', 2''.

During operation, when the brake disc engages tangentially on the indicator and the plate 14, the latter comes away from the ends 2', 2'' suddenly when the friction generated by the disc becomes sufficient to tear the plate off from the bottom of the cut-out 16. The circuit 2', 2'' is then broken very cleanly.

Figure 7:
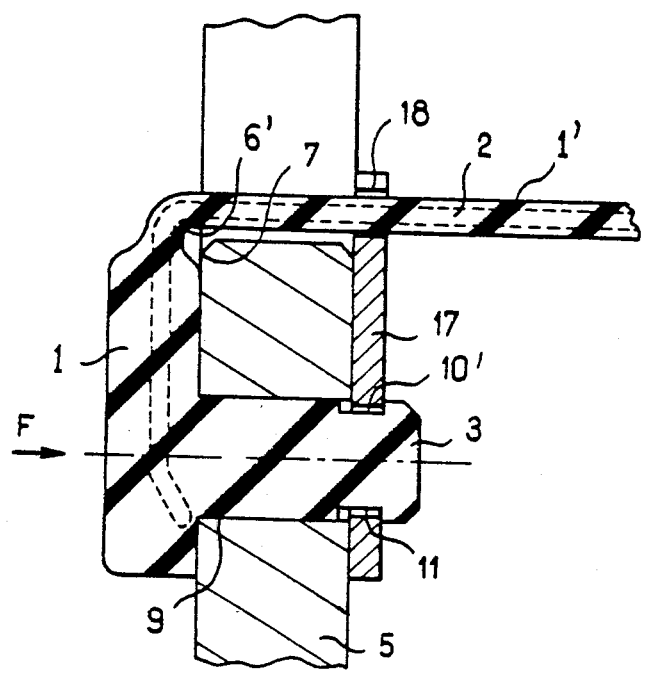
FIG. 7 is similar to FIGS. 2 and 5 and illustrates a third embodiment of the wear indicator according to the invention equipped with a removable piece.
Figure 8:
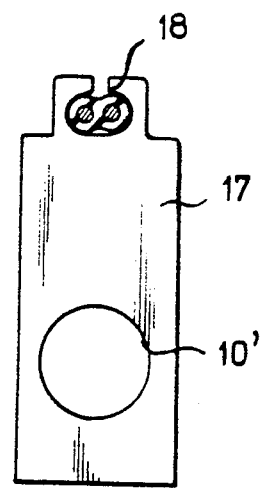
FIGS. 8 and 9 are plan views of two embodiments of the removable piece of the wear indicator according to the invention.
Figure 9:
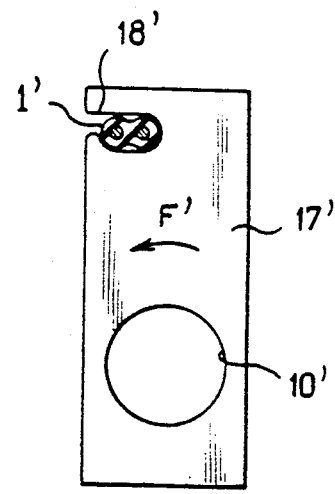

FIGS. 7 to 9 illustrate a third embodiment of the wear indicator according to the invention in which the fatening means also comprises a removable piece 17 replacing the lug of the indicator of the preceding embodiments, which is molded in one piece with the body and the stud.

The piece 17 has an open slot 18 (see FIG. 8). By means of this slot 18 the piece 17 is fastened by snapping onto a wire-shaped part 1' of the indicator, in a position suitable for allowing the indicator to be fastened subsequently to the friction member, as will be seen later.

To fasten the indicator according this third embodiment of the invention to the support plate 5, a stud 3 is inserted according to the arrow F (FIG. 7) into a hole 9 made in this plate, and the wire-shaped part 1' is turned down round the edge 7 at 6', to make the projecting end of the stud 3 enter an orifice 10' (FIG. 8) made in the removable piece 17 which has previously been mounted on the part 1' of the indicator. Retention means consisting of an annular groove 11 made near the end of the stud 3 ensure that the removable piece 17 catches on the stud by bearing on the edge of the orifice 10.

FIG. 9 illustrates another embodiment 17' of the removable piece forming part of the fastening means of the indicator accoridng to the invention. This piece 17' also has an orifice 10' and an open slot 18', but the later is cut out in the piece 17' so as to allow the indicator equipped with this piece to be mounted in a different way from the mounting described above.

In fact, to fasten the indicator eqipped with the piece 17' to a friction member, the stud 3 is first inserted into the hole 9, as in FIG. 7, and then the piece 17' is fastened to the stud 3 by introducing the end of the latter into the orifice 10'. Subsequently, the piece 17' is rotated about the axis of the stud in the direction of the arrow F' (FIG. 9), so that the slot 18' snaps round the wire-shaped part 1' of the wear indicator according to the invention. Of course, the slot 18' is cut out at a distance from the axis of the orifice 10' corresponding to the center distance between the stud 3 and the part 1' after the indicator has been fastened to the plate 5 of the friction member.

The piece 17 or 17' is retained on the indicator according to the invention at two points, thus ensuring that the latter is fastened securely to the plate 5.

The three embodiments of the indicator according to the invention thus emerge as being cheap to produce, installed easily, quickly and securely and operating in a non-erratic way because of the cleanness of the break of the loop.

Of course, the invention is not limited to the embodiments described and illustrated, which have been given only as examples. In particular, although the description refers to the fastening of an indicator according to the invention to a friction member of a disc brake, it is clear that this indicator could just as well be mounted on a friction member of a drum brake, provided that it is adapted in a way obvious to a person skilled in the art.

Likewise, although the indicators described, comprising a conductor designed so that its electrical continuity is broken in the event of a critical wear of the associated friction member, to provide the test possibility mentioned in the introduction, it is clear that a simpler indicator, but one having the other advantages of the indicator according to the invention, could be produced by embedding the free end of a single-wire conductor in the body of the indicator instead of the loop provided in the indicator according to the invention.

Lastly, the removable piece can be made of any suitable material, for example metal or plastic. In particular, it can be made with the plastic used for molding onto the conductor of the indicator.

We claim:

1. Wear indicator for a friction member of a motor-vehicle brake, designed to be mounted on the friction member in such a way that an electrical conductor forming part of the indicator is engaged by a rotary piece forming part of the brake when the friction member reaches a thickness below a predetermined value, the indicator comprising an elongate body supporting the electrical conductor and means of fastening to the friction member, characterized in that the fastening means consist of a lug (4,17,17') and a stud (3) which are arranged at a distance from one another and which are disposed on the body (1) on each side of a deformable part of the latter, the stud being shaped so as to enter a hole (9) made near one edge of the friction member and, after the bending of the deformable part of the body, catch in an orifice (10,10') made in the lug.

2. Indicator according to claim 1, characterized in that the indicator comprises retention means (11) for ensuring that the stud (3) catches in the orifice (10,10') of the lug (4,17,17').

3. Indicator according to claim 2, characterized in that the retention means consist of an annular groove made near the end of the stud (3) and interacting with the orifice (10,10') in order to retain the lug (4,17,17') against a support plate (5) of the friction member.

4. Indicator according to claim 3, characterized in that the lug (4) is formed with the body (1) and the stud (3) in one piece, by molding plastic, a root (4') of the lug (4) being thinned in order to allow the latter to tilt on the body (1).

5. Indicator according to claim 3, characterized in that the deformable part of the body has a weakening incision (6) defining a bending axis of the body (1).

6. Indicator according to claim 3, characterized in that the lug (4) is a removable piece (17,17') having an open slot (18,18') designed to allow the piece to catch on a wire-shaped part (1') of the indicator.

7. Indicator according to claim 6, characterized in that the deformable part (6') is formed as a result of the connnection of the wire-shaped part (1'), surrounding the conductor, to the body (1) of the indicator.

8. Indicator according to claim 6, characterized in that the open slot (18') is designed to allow the removable piece (17') to catch on the wire-shaped part (1') as a result of the rotation of the removable piece about an axis of the stud (3).

9. Indicator according to claim 3, characterized in that the conductor (2) has a loop-shaped part which, after the indicator has been fastened to the friction member, extends in a plane parallel to a wearing plane of the indicator, one end (12) of the loop being anchored in the material of the body by means of bending, the loop thus being designed to be cut by the rotary piece of the brake when the critical wear of the friction member is reached.

10. Indicator according to claim 5, characterized in that the conductor comprises a metal plate (14) which bridges two adjacent ends (2',2") of electrical wires forming part of the conductor, to ensure the electrical continuity of the latter, this metal plate being arranged in the body (1) so as to be torn off by the rotary piece of the plate when the critical wear of the friction member is reached.

11. Indicator according into claim 10, characterized in that the plate is slipped into flutes (15',15") formed in a cut-out (16) of the body (1).

* * * * *